United States Patent [19]

Driggers

[11] Patent Number: 4,530,510
[45] Date of Patent: Jul. 23, 1985

[54] LOG ROLLER

[76] Inventor: Robert H. Driggers, 105 Beth Dr., Greenville, S.C. 29606

[21] Appl. No.: 550,891

[22] Filed: Nov. 10, 1983

[51] Int. Cl.³ .............................................. B62B 3/00
[52] U.S. Cl. ................................ 280/47.17; 280/47.2; 280/47.26; 280/47.33; D34/26
[58] Field of Search .............. 280/47.17, 47.18, 47.16, 280/47.2, 47.27, 47.28, 47.24, 47.33, 47.12, 79.1 A, 79.1 R; D34/23, 24, 25, 26

[56] References Cited

U.S. PATENT DOCUMENTS

D. 267,359  12/1982  Mustard ............................... D34/26
2,277,302   3/1942   Chenette ......................... 280/47.27
2,616,720  11/1952   Knoth ............................. 280/47.24

Primary Examiner—David M. Mitchell
Attorney, Agent, or Firm—Bailey & Hardaway

[57] ABSTRACT

An apparatus is provided for transporting logs from the exterior of a dwelling to the interior of a dwelling. The apparatus comprises a platform and retaining members with a pair of wheels at either end thereof. The apparatus is operated on the exterior of a dwelling by rolling upon a pair of wheels, and in the interior of a dwelling upon the other pair of wheels.

4 Claims, 5 Drawing Figures

LOG ROLLER

BACKGROUND OF THE INVENTION

This invention relates generally to the art of article transporting, and more particularly to an apparatus and method for transportation and storage of wood for use as fuel.

With the advent of significantly increased fuel costs has come an expanded interest in the utilization of fireplaces, wood burning stoves, and other localized heating apparatus to supplement, and in some cases, replace conventional heating means. The burning of inexpensive wooden logs in such apparatus has been found to be a significant savings over the cost associated with fuel oil, gas and electricity.

Normally a supply of logs is maintained in a large inventory on the exterior of a dwelling exposed to the out-of-doors, and a small inventory is maintained near the wood burning apparatus. There has, thus, evolved the problem of transporting logs from the exterior of a dwelling to the interior without soiling or tracking the interior of the dwelling while so doing.

Various attempts have been made to provide apparatus or carts for transporting logs. A problem with the use of carts is the tendency of the wheels to track debris from the exterior of the dwelling to the interior thereof.

An attempt to overcome this problem has involved the use of a cart within a cart, whereby one cart is utilized on the exterior of the dwelling to move logs and the smaller cart to the dwelling entrance whereupon the transported carrier is removed from the larger carrier for use within the dwelling.

Within the patent literature, various utility carts and handtrucks have been devised for multiple uses. Examples of such apparatuses are described in U.S. Pat. Nos. 3,104,890; 3,785,669; 2,884,257; 2,598,261; and 1,374,372.

While many devices have managed to reduce the manual labor required for log moving, there has been no totally satisfactory device which eliminates the spreading of debris from the exterior to the interior of a dwelling without making a transition at the threshold.

SUMMARY OF THE INVENTION

It is thus an object of this invention to provide a novel apparatus for transporting logs.

It is a further object of this invention to provide a novel apparatus for transporting logs which operates both on the interior and exterior of a dwelling without spreading debris from the exterior environment to the interior of a dwelling.

It is a still further object of this invention to provide a novel process for transporting logs from the exterior of a dwelling to the interior thereof.

These as well as other objects are accomplished by an apparatus having a platform with a pair of wheels at either end thereof, and retaining means associated with each end of the platform. The pair of wheels at one end of the platform are of a lesser diameter than the pair at the other end thereof. The apparatus is tilted to roll upon the larger pair of wheels while on the exterior of a dwelling and to roll upon the smaller pair of wheels when on the interior of a dwelling.

DETAILED DESCRIPTION

In accordance with this invention it has been found that an apparatus may be utilized to ease the transportation of logs and firewood on both the interior and exterior of a dwelling without the problems of tracking in debris associated with the prior art devices. Various other advantages and features will become apparent from a reading of the following description with reference to the various figures of drawing.

Figure 1:
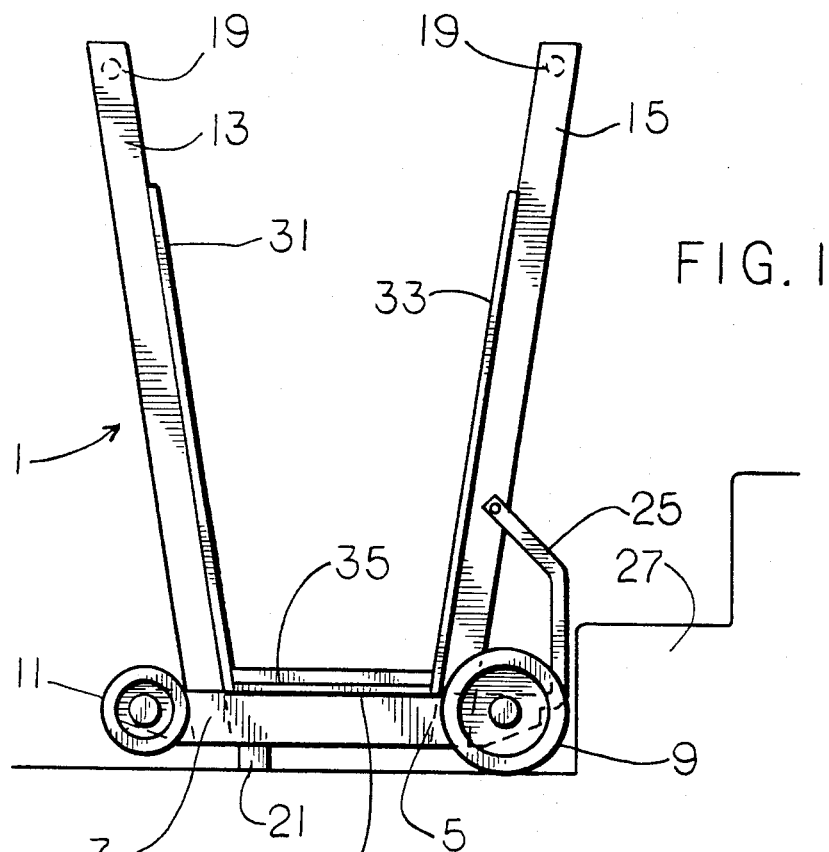
FIG. 1 of the drawings is a side view of an apparatus in accordance with this invention.

FIG. 1 of the drawings illustrates an apparatus 1 in accordance with this invention. The apparatus comprises a platform 3 having a distal end 5 and a proximal end 7. The terms proximal and distal are utilized merely for purposes of this description and clarity. The apparatus comprises a pair of wheels 9 at the distal end thereof, and a pair of wheels 11 at the proximal end thereof. The pair of wheels 9 at the distal end of the platform are of a greater diameter than the pair 11 at the proximal end thereof for purposes to be described below.

A retaining member 13 is at the proximal end of the apparatus and a complementary retaining member 15 is at the distal end thereof. The purpose of the retaining members 13 and 15 is to retain a stack of logs therebetween. Thus the platform 3 and retaining members 13 and 15 retain a stack of logs for being transported by the apparatus. Handle means 17 and 19 are at the upper extremity of the retaining members.

In order to maintain the platform 3 in a level position and to compensate for the differences in diameter between the pair of wheels at the distal end and proximal end, levelling means 21 is provided such that when the apparatus is at rest, the apparatus is supported by the pair of wheels 9 and levelling means 21. Thus wheels 11 at the distal end normally do not contact either the floor or ground surfaces when the apparatus is at rest as illustrated in FIG. 6. This aspect is particularly desireable in the out of door mode.

In use, the apparatus is tilted by utilizing either handle means 17 or 19 to permit rolling of the apparatus upon the pair of wheels at the same end as the handle.

Figure 3:
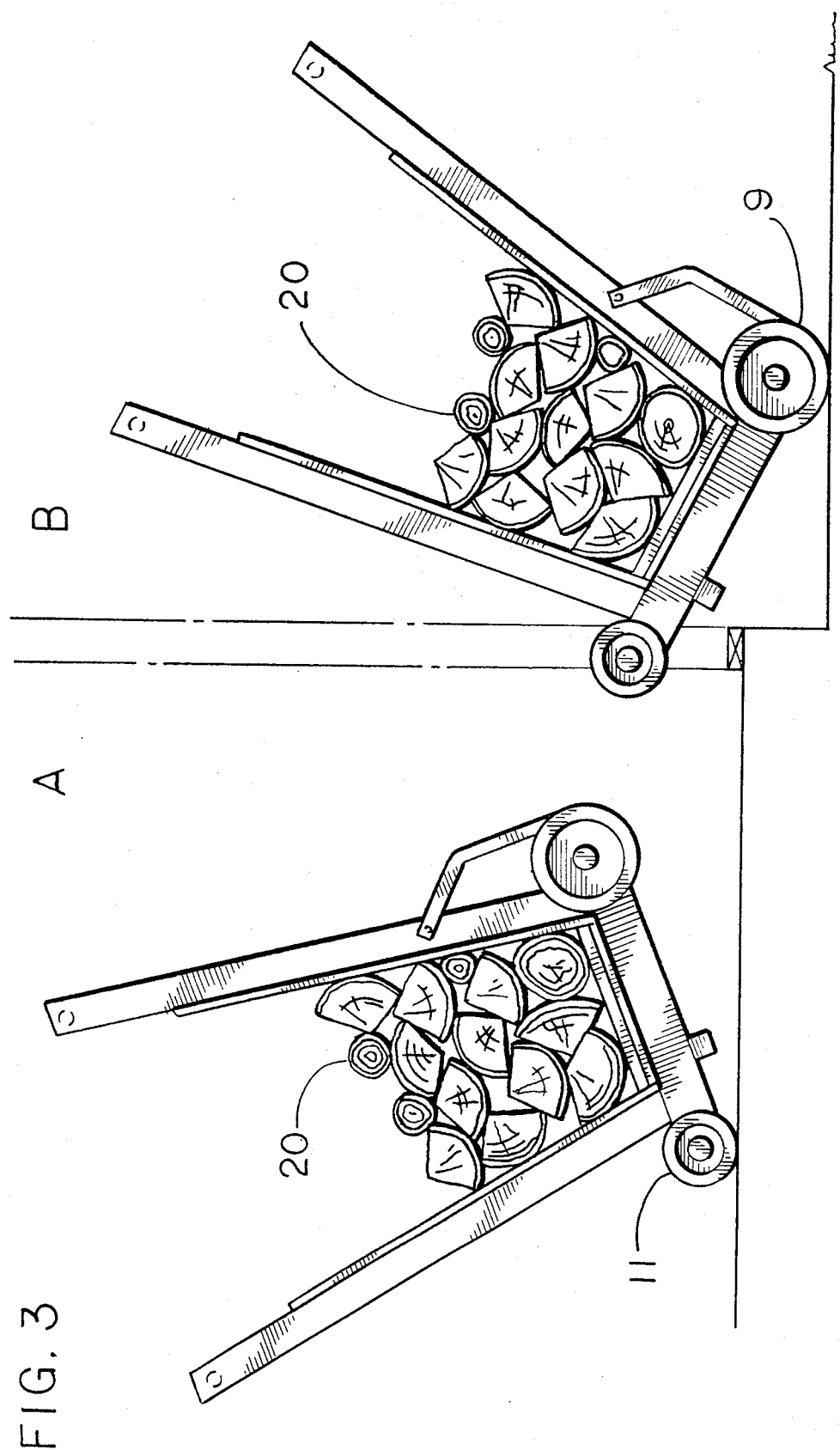
FIG. 3 of the drawings is a view similar to FIG. 1 illustrating use of the apparatus on both the interior and exterior of a dwelling.

FIG. 3 of the drawings illustrates the apparatus with logs 20 on the exterior A and interior B of a dwelling. Thus, when the apparatus in used on the exterior of dwelling, the apparatus is rolled upon the pair of wheels 9 at the distal end thereof. When entering a dwelling, however, the apparatus is partially pushed through a threshold whereupon the apparatus is tilted in the opposite direction upon pair of wheels 11 for movement about the interior of the dwelling. Since the larger pair of wheels 9 only contacts the interior of the dwelling when the apparatus is at rest, no tracking of exterior debris into the interior of the dwelling is permitted.

As an optional feature, and as best illustrated in FIG. 1, the apparatus may further comprise a skid 25 at the distal end thereof to ease movement up and down stairs as illustrated at 27 in FIG. 1.

Figure 2:
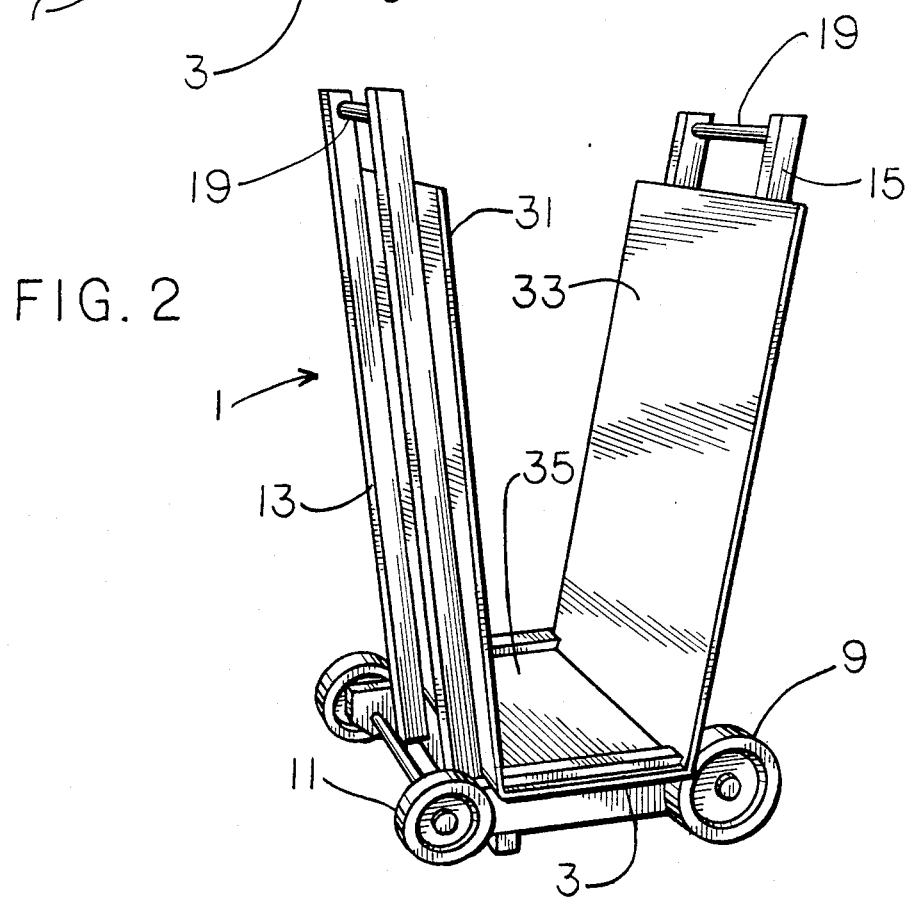
FIG. 2 of the drawings is a perspective view of the apparatus illustrated in FIG. 1.

The apparatus illustrated in FIGS. 1 and 2 possesses liners 31, 33 and 35 to aid in retaining a stack of logs while simultaneously preventing debris from falling from the apparatus.

Figure 4:
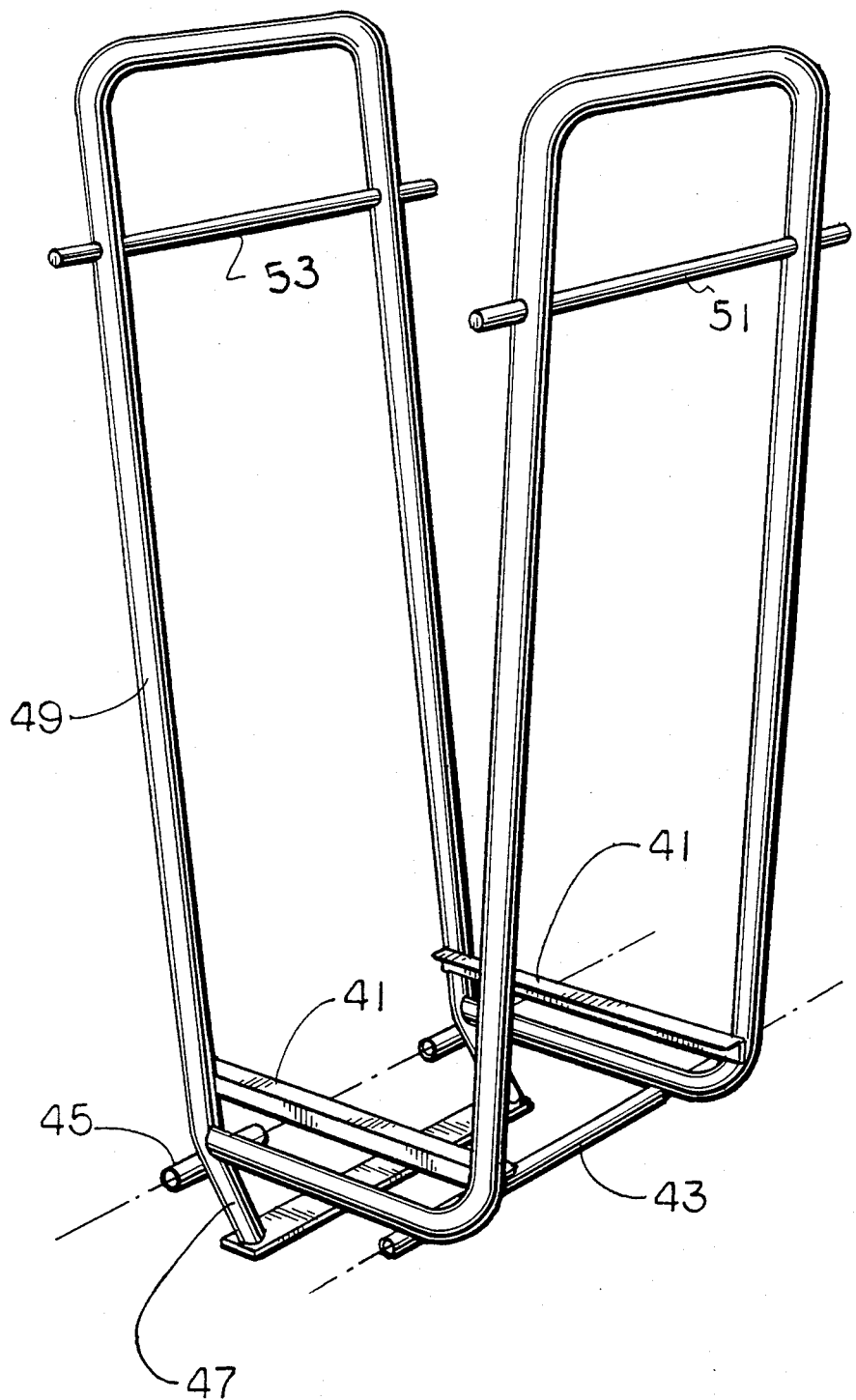
FIGS. 4 and 5 of the drawings illustrate perspective views of another embodiment in accordance with this invention.

An alternative embodiment is illustrated in FIG. 4 of the drawings wherein a frame construction is illustrated, and which may preferably be formed of tubular material.

Figure 5:
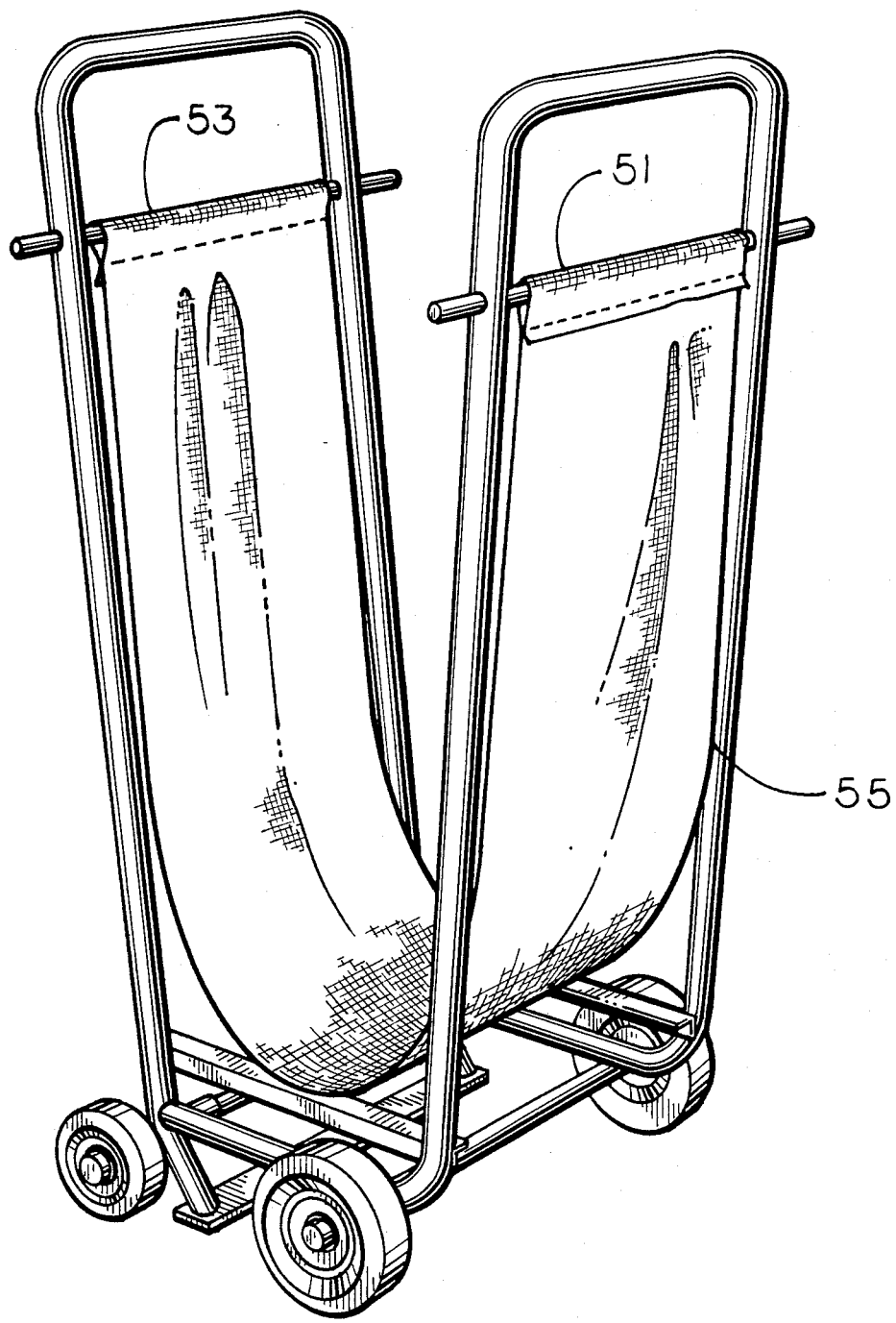

In the FIG. 4 embodiment a pair of braces 41 defines a platform while an axel 43 is illustrated for attachment of large wheels at the distal end (which is illustrated as the closer proximity in FIG. 4), and an axel 45 together with a complementary axel on the opposite side thereof (not shown) are for attachment of a pair of wheels at the proximal end thereof. The wheels are not illustrated in the FIG. 4 embodiment in order to permit full viewing of the structure. In the FIG. 4 embodiment the levelling means 47 is formed by an extension of retaining member 49 FIG. 4 also illustrates attachment rods 51 and 53 for hanging a fabric liner as illustrated at 55 in FIG. 5.

It is thus seen that the apparatus of this invention is capable of many constructions with various materials. The primary feature of the apparatus in accordance with this invention, and its use in accordance with the method of this invention, is that the apparatus be utilized and transported upon one set of wheels on the exterior of the dwelling and upon another set on the interior thereof. As many modifications will become apparent to one of skill in the art upon a reading of the foregoing specifications, such modifications are within the spirit and scope of this invention as is defined by the following appended claims.

What is claimed is:

1. An apparatus for transporting firewood from the exterior of a dwelling to the interior thereof, comprising:
    a platform having a proximal end and a distal end;
    a pair of wheels at the proximal end of said platform;
    a pair of wheels at the distal end of said platform, said pair at the distal end being of greater diameter than said pair at the proximal end;
    a proximal retaining member extending generally vertically upward from said platform from the proximal end thereof;
    a distal retaining member extending generally vertically upward from said platform from the distal end thereof;
    handle means at the upper extremity of each retaining member, whereby said apparatus may be tilted and rolled on either of said pair of wheels utilizing the handle means at the same end thereof for so doing.

2. The apparatus according to claim 1 further including a levelling means at the proximal end of said platform to maintain said platform in a substantially horizontal plane when said apparatus is resting upon said pair of wheels at the distal end.

3. The apparatus according to claim 2 wherein said levelling means comprises an extension of said proximal retaining means.

4. A process for transporting logs from the exterior of a dwelling to the interior thereof, comprising the steps of:
    providing an apparatus comprising,
        a platform having a proximal end and a distal end,
        a pair of wheels at the proximal end of said platform,
        a pair of wheels at the distal end of said platform, said pair at the distal end being of greater diameter than said pair at the proximal end,
        a proximal retaining member extending generally vertically upward from said platform from the proximal end thereof,
        a distal retaining member extending generally vertically upward from said platform from the distal end thereof,
        handle means at the upper extremity of each retaining member, whereby said apparatus may be tilted and rolled on either of said pair of wheels utilizing the handle means at the same end thereof for so doing;
    stacking logs from the exterior of a dwelling between said proximal retaining member and said distal retaining member;
    tilting said apparatus by the handle means at the distal end of said apparatus to roll said apparatus upon said pair of wheels at the distal end thereof;
    rolling said apparatus to the said entry;
    tilting said apparatus by the handle at the proximal end thereof; and
    rolling said apparatus to the said entry;
    tilting said apparatus by the handle at the proximal end thereof; and
    rolling said apparatus by the pair of wheels at the proximal end thereof until placing the apparatus at rest on the pair of wheels at the distal end thereof.

* * * * *